United States Patent

Kroos

[15] 3,681,614

[45] Aug. 1, 1972

[54] ECL GATE SWITCHING NETWORK

[72] Inventor: Friedrich-Karl Kroos, Soecking, Germany

[73] Assignee: Siemens Aktiengesellschaft, Berlin and Munich, Germany

[22] Filed: Feb. 4, 1971

[21] Appl. No.: 112,717

[30] Foreign Application Priority Data

Feb. 6, 1970 Germany.............P 20 05 576.9

[52] U.S. Cl. ..................307/203, 307/235, 307/243, 328/147, 330/30 D

[51] Int. Cl.........................H03k 19/00, H03k 17/00

[58] Field of Search......307/216, 203, 235, 289, 244, 307/243; 328/150, 146, 147, 115; 330/30 D, 23, 69

[56] References Cited

UNITED STATES PATENTS

| | | | |
|---|---|---|---|
| 3,452,289 | 6/1969 | Ryan | 330/23 |
| 3,519,810 | 7/1970 | Priel | 307/216 |
| 2,572,792 | 10/1951 | White | 328/154 |
| 3,040,192 | 6/1962 | Slobodzinski | 307/216 |
| 3,422,283 | 1/1969 | Murray | 307/289 |

*Primary Examiner*—Rudolph V. Rolinec
*Assistant Examiner*—David M. Carter
*Attorney*—Hill, Sherman, Meroni, Gross & Simpson

[57] ABSTRACT

An ECL gate switching network having a "lower" and a pair of "upper differential amplifiers, each comprising a pair of transistors, in which each of the transistors of the "lower" amplifier is in a series circuit with a respective "upper" amplifier and a constant current source, each of the "upper" amplifiers having direct control at only one side thereof, and the "lower" amplifier having direct control at both sides thereof, the output sides of the respective directly controlled transistors of the "upper" amplifiers each being connected to the output side of the indirectly controlled transistor of the other of said "upper" amplifiers, each pair of connected output sides forming an output side of the network and being respectively operatively connected to the appropriate side of an operational voltage source.

5 Claims, 3 Drawing Figures

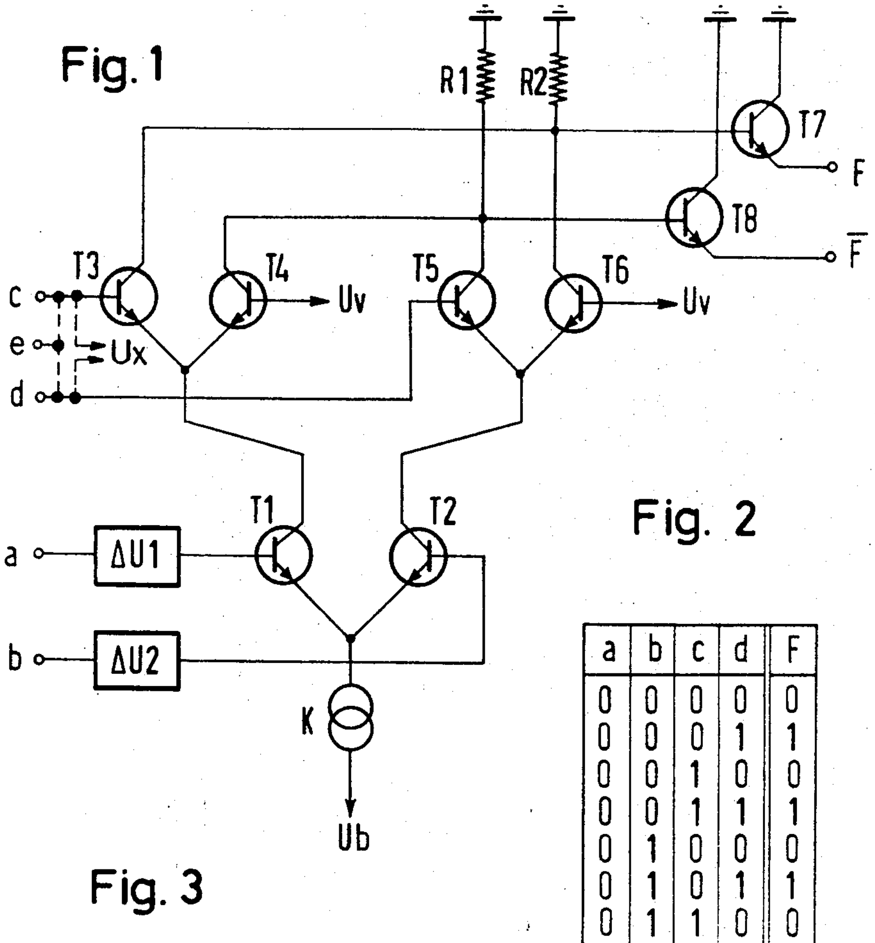
Fig. 1
Fig. 2
| a | b | c | d | F |
|---|---|---|---|---|
| 0 | 0 | 0 | 0 | 0 |
| 0 | 0 | 0 | 1 | 1 |
| 0 | 0 | 1 | 0 | 0 |
| 0 | 0 | 1 | 1 | 1 |
| 0 | 1 | 0 | 0 | 0 |
| 0 | 1 | 0 | 1 | 1 |
| 0 | 1 | 1 | 0 | 0 |
| 0 | 1 | 1 | 1 | 1 |
| 1 | 0 | 0 | 0 | 1 |
| 1 | 0 | 0 | 1 | 1 |
| 1 | 0 | 1 | 0 | 0 |
| 1 | 0 | 1 | 1 | 0 |
| 1 | 1 | 0 | 0 | 0 |
| 1 | 1 | 0 | 1 | 1 |
| 1 | 1 | 1 | 0 | 0 |
| 1 | 1 | 1 | 1 | 1 |
Fig. 3
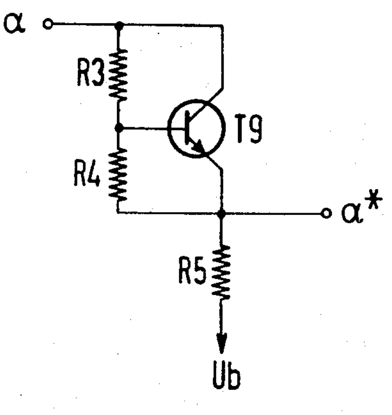
INVENTOR
Friedrich-Karl Kroos
BY Hill, Sherman, Meroni, Gross & Simpson ATTYS.

ECL GATE SWITCHING NETWORK

BACKGROUND OF THE INVENTION

The invention relates to a logical gate switching network, in particular a series-coupled switching network with asymmetric control, utilizing so-called emitter-collector logic switching network technique.

The basic element of the so-called ECL switching network technique, as is known, is a differential amplifier having two emitter-coupled transistors which are oppositely and alternately brought into a blocked or a conductive state by control of the base of one of the two transistors through the use of a binary signal, saturation of either transistor, during conduction, being prevented by means of suitable current regulation. As the regulated current is conducted over one or the other transistor, depending upon the input signal, such type of circuit has sometimes been termed a current transfer circuit.

An OR-NOR linkage of several input variables can be achieved if the collector-emitter paths of further transistors are circuited parallel to the collector-emitter path of the directly-controlled transistor of the differential amplifier. Other logical functions can be realized in an advantageous manner (with short data transit times and low current consumption) by so-called "series coupling." (Compare "The Electronic Engineer," November 1967, pages 56–60.)

This designation refers to a series connection of differential amplifiers in such manner that the transistors of a "lower" differential amplifier are inserted into the supply lines of the emitters of the transistors of differential amplifiers which are taken together in pairs and which are now called the "upper" amplifiers. A controllable current path of the "lower" differential amplifier or both of them are thus split into two also oppositely-controllable current paths by the "upper" differential amplifiers. If necessary, the collectors of two transistors which do not belong to the same differential amplifier may be suitably connected and supplied with operational voltage over a common collector resistance.

One form of logically linking two input variables by means of a simple ECL switching network is also illustrated in German published patent application No. 1,246,027, in which it is proposed to supply the bases of both transistors of a differential amplifier stage with different input signals, in which, however, the potential of one input signal must preferably be shifted over half of the signal range in order to obtain clear, logical states at the output.

The present invention enables the production of an ECL gate switching network having short signal transit times and low current consumption, and which at the same time provides increased logical linkage possibilities as compared with prior arrangements.

BRIEF DESCRIPTION OF THE INVENTION

The present invention is directed to an ECL gate switching network in which two "upper" differential amplifiers are provided and a "lower" differential amplifier, each amplifier comprising two transistors, the emitters of which are connected. The collectors of the respective transistors of the lower amplifier are each connected to the connected emitters of one of the upper amplifiers, and similarly the connected emitters of the lower amplifier are connected to a constant current source.

One transistor of each "upper" amplifier is adapted to be directly controlled by binary signals and the base of such transistor may thus form one input of the network. The other transistor of each "upper" amplifier is adapted to be indirectly controlled in the operation of the network and thus, for example, may have its base connected to a fixed potential.

The collectors of the transistors of the "upper" differential amplifiers are cross-connected, the emitter of each directly controlled transistor being connected to the indirectly controlled transistor of the other "upper" amplifier. Each pair of connected collectors may thus form an output of the network and may be connected to a suitable operational potential source through respective collector resistances.

Both transistors of the "lower" amplifier are directly controlled and their respective bases thus each may form an input for the network. Preferably there is disposed in each signal path to the respective bases of such transistors respective potential shifting circuits.

By appropriate connections of the respective inputs, to each other and/or to fixed potentials, and selection of the various inputs to receive the binary signals, a wide variety of logical linkages may be effected.

BRIEF DESCRIPTION OF THE DRAWINGS

In the drawings wherein like reference characters indicate like or corresponding parts:

FIG. 1 is a schematic diagram of a logical switching network embodying the invention;

FIG. 2 is a table of magnitudes applicable to the switching network of FIG. 1; and FIG. 3 is a schematic circuit of an example of a shifting network applicable to the circuit of FIG. 1, and merely symbolically indicated therein.

DETAILED DESCRIPTION OF THE INVENTION

Referring to the drawings and more particularly to FIG. 1 thereof, there are illustrated three differential amplifiers, a "lower" differential amplifier comprising transistors T1 and T2, the emitters of which are connected and in which the emitter-collector paths of such transistors form oppositely-controllable current paths. The transistors T3 and T4, also having their emitters connected, form one "upper" differential amplifier while the transistors T5 and T6, likewise having their emitters connected, form a second "upper" differential amplifier. The collector of transistor T1 is connected to the connected emitters of transistors T3 and T4 and in like manner the collector of transistor T2 is connected to the connected emitters of transistors T5 and T6, the transistors thus being arranged according to the principle of so-called series coupling (series gating), and it will be apparent that the transistors of each "upper" amplifier split the current paths, formed by the respective transistors T1 and T2, into two additional current paths. The emitters of the transistors T1 and T2 are in turn connected to a circuit arrangement, symbolically indicated by the letter K, which maintains the current constant through the system and thus, irrespective of the signal potentials or the fixed potentials at the bases of the transistors T1 through T6, none of such transistors will pass into a state of saturation.

Similar to previous series-coupled ECL switching networks, the transistors T3 or T5 of the two "upper" differential stages may be directly controlled at the input terminals *c* or *d* by correspondingly designated input signals, which thus will be applied to the corresponding base of the transistor involved. The bases of transistors T4 and T6 may be suitably connected to a fixed reference potential Ub of, for example, −1.2 volt which may, for example, correspond to the average value between the high and low input potentials at the inputs *c* and *d*, i.e., a high of −0.8 volt and a low of −1.6 volt.

The collectors of transistors T3 and T6 are connected, and in like manner the collectors of transistors T4 and T5 are connected so that in each case the collector of a directly controllable transistor of one amplifier is connected to the indirectly controlled transistor of the other amplifier and each pair of connected collectors is operatively connected over an associated common resistance to a suitable operational potential Uo which in the present instance, utilizing NPN-transistors, would be the positive pole of the operation voltage source, the collectors of transistors T4 and T5 being connected to such voltage source over common collector resistance R1 and the collectors of transistors T3 and T6 being connected to such source over common collector resistance R2. Terminals F and $\overline{F}$, forming the output terminals of the network are, in the embodiment illustrated, operatively connected to the respective connected collectors over respective emitter follower circuits, comprising transistors T7 and T8, which are adapted to supply the correspondingly designated output signals with potentials which are properly poled for the control of ECL switching networks which may be connected to the output terminals F and $\overline{F}$.

The "lower" differential amplifier stage comprising transistors T1 and T2, in contrast to the "upper" amplifiers, is directly controllable at both sides over input terminals *a* and *b* as opposed to previous series-coupled ECL switching networks. The resulting circuit considerably increases the logical linkage possibilities achievable from the combination of the two respective features of the invention which per se are known, namely the utilization of a series coupling, and the double sided control of differential amplifiers with emitter coupling by means of binary signals and such increased logical linkage possibilities enables the realization of relatively complicated logical functions.

If the signals are designated by the terminals at which they appear or are supplied, which designations will be subsequently utilized, the linkage functions resulting at the oppositely phased outputs $F$ and $\overline{F}$ will be as follows:

$$F=\overline{a\bar{b}}\,d+a\,\bar{b}\,\bar{c}=(\bar{a}+b)\,d+a\,\bar{b}\,\bar{c}$$

$$\overline{F}=\overline{a\bar{b}}\,\bar{d}+a\,\bar{b}\,c=(\bar{a}+b)\,\bar{d}+a\,\bar{b}\,c$$

A table of values which correspond to the function $F$ is illustrated in FIG. 2.

In utilization of the gate switching network according to the invention, it should be kept in mind that the input signals *a* and *b* usually have the same potential position as input signals *c* and *d* for the "upper" differential amplifiers and thus will normally not be suitable for the direct control of transistors such as T1 and T2 of FIG. 1. It is common practice, in connection with series-coupled switching networks in ECL techniques, to effect a suitable shifting of the potentials of the input signals to the "lower" differential amplifier, which can be suitably accomplished by insertion between the input terminal and the base of the respective transistor involved, and which in the case of npn transistors would be toward the negative. Additionally, it is particularly desirable that the potential shift of one input signal is different from that of the other signal. This is symbolically indicated in FIG. 1 by the two rectangles respectively designated $|\Delta U1|$ and $|\Delta U2|$. While it is of no basic importance insofar as the operation of the circuit illustrated in FIG. 1 is concerned as to which of the two potential shifts is the greater, $|\Delta U1| > |\Delta U2|$ must be employed on the basis of the terminal or signal designations in connection with the defined logical functions and the table of values represented in FIG. 2. Such potential shifts, for example, may be 1.6 volt for ΔU1 and 1.2 volt for ΔU2.

A suitable circuit arrangement for effecting such a potential shift is illustrated in FIG. 3 in which the shifting network therein disclosed comprises a transistor T9 and resistors R3, R4, and R5, the resistors being connected in series with the base of transistor T9 connected to the juncture of resistors R3 and R4, the collector to the opposite end of resistance R3, and the emitter connected to the juncture of resistors R4 and R5. The free end of resistor R5 is adapted to be connected to a suitable voltage source and the juncture of resistor R3 and collector of transistor T9 forms the input $\alpha$ while the juncture of the emitter of transistor T9 with the resistors R4 and R5 forms the output $\alpha^*$. It will be appreciated that this circuit remains of low ohmic resistance in both states of the binary input signals and results in very short signal-transit times and a neglectably low decrease of the signal strength. The amount of the potential shifting can be readily calculated from the relation $\Delta U = U\alpha - U\alpha^* = (1 + R3/R4)$ Ueb, in which Ueb is the voltage drop across the conductive emitter-base path of the transistor T9.

However, the shifting network illustrated in FIG. 3 has the disadvantage of imposing a higher loading on the signal source as compared to the inputs *c* and *d*, due to the additional reactive current over the resistors R3 through R5 and which does not directly in any way contribute to the control of the subsequent transistors T1 or T2. In the event that such increased loading on the signal source is not tolerable, it may be advantageous to add another transistor, preceding the shifting network of FIG. 3, in the form of an emitter follower. The input $\alpha$ of the shifting network illustrated in FIG. 3 would thus be connected with the emitter of such additional transistor while its collector is operatively connected to reference potential.

It should also be taken into account that the smallest potential shifting obtainable with the circuit of FIG. 3 is about 1.6 volt since, in addition to the shifting, an emitter-base voltage Ueb occurs as the result of the shifting network. This can be balanced out in a simple manner by means of corresponding dimensioning of the switching network. In the event additional transistors are connected parallel to the directly controlled transistors T1, T2, T3 and T5 with respect to their collector-emitter paths, additional OR linkages $a1 + a2$ . . ., $b1 + b2$ . . . . etc., will be obtained. However, for each

*a* input or *b* input, additionally provided in this manner, an additional shifting network will still be necessary and consequently, if possible, such circuit enlargements will normally be effected only when necessary, and then, if possible, only at the inputs *c* and *d*.

A further variation of the circuit arrangement illustrated in FIG. 1 results, in accordance with the invention, from the connection of the inputs *c* and *d*, as illustrated in broken lines in FIG. 1, and if the new joint input is designated to correspond to the input variable applied thereto, namely *e*, the output function then becomes $F1 = (\bar{a}+b)\,e + \overline{abe} = a\bar{b}e + \overline{abe} = (a\bar{b}) \not\equiv e$ in which the sign $\not\equiv$ stands for antivalence (exclusive OR).

This function, or the gate switching network accomplishing the same, has the remarkable property that by means of the connection of one input to a fixed potential which corresponds to the signal value "0" or "1" and/or by connecting two input terminals, various different functions can be produced from two variables as follows:

| | | | |
|---|---|---|---|
| For: | $a$ = "1" then | $F1 = be + \bar{b}\bar{e}$ | (equivalency) |
| | $b$ = "0" | $F1 = \bar{a}e + a\bar{e}$ | (anti valence) |
| | $e = a$ | $F1 = ab$ | (and) |
| | $e = b$ | $F1 = a + b$ | (or) |
| | $e$ = "0" | $F1 = a\bar{b}$ | (inhibition) |
| | $e$ = "1" | $F1 = \bar{a} + b$ | (implication) |

Thus six of the eight existing linkages of two variables may be realized with the signal switching network in which no inverted input signals are required.

The two functions $\overline{ab}$ (NAND) and $\overline{a+b}$ (NOR) can also be achieved with this circuit if, in addition, the inverted output $\overline{F1}$ is provided. F1 thus becomes $ab$ (NAND) for $e = a$ and $\overline{F1} = \overline{a+b}$ (NOR) for $e = b$.

As research and investigation has proven, (compare Y.N. Patt: Synthesis of switching functions using a minimum number of integrated-circuit modules, " Technical Report AFAL–TR–67–142" Standford University, Stanford, USA), a switching network which realizes the function $$\overline{F1} = \overline{a\bar{b}e} + a\bar{b}e = (a\bar{b}) \cdot e = (\bar{a}b) \not\equiv \bar{e}.$$

can also be utilized as a basic circuit of a digital system. Similarly, as with NAND or NOR gates, all logical linkages can be achieved with this switching network, whereby only an inverted output $\overline{F1}$ is required.

Including the previously mentioned possibilities of applying fixed potentials to selected inputs or to connect respective inputs with each other, each desired function of three variables can be formed with three of such switching networks at the very most. In this event, only two switching networks need be connected in series, resulting in a decided advantage with respect to the total signal transit time. In comparison, six circuits in three stages are required in the most adverse case in the utilization of NOR or NAND gates. A further comparison reveals additional advantages with respect to a reduction in the number of connecting lines required in the utilization of networks according to the invention in its various forms, and which are even greater when compared with NOR or NAND gates. If it is sought to simultaneously achieve all 256 possible functions of three variables, 525 switching networks in accordance with the invention would be required, while 1124 NOR or NAND gates would be needed for the same result.

Preceding from the basic circuit illustrated in FIG. 1, it is thus possible, of course, to combine two desired other inputs instead of connecting the inputs *c* and *d* as single common input. However, since all linkages which are derived in this way can also be produced with normal, series-coupled ECL switching networks which have the base of one of the two transistors corresponding to T1 and T2 of the lower differential amplifier connected to a fixed potential, there would appear to be no necessity to go into detail with respect to this type of circuit.

Having thus described my invention it will be obvious that various and material modifications may be made in the same without departing from the spirit of my invention.

I claim as my invention:

1. In an ECL gate switching network, the combination of a "lower" and a pair of "upper" differential amplifiers, each comprising a pair of transistors, the emitters of each amplifier having their emitters connected, each "upper" amplifier having one transistor thereof circuited to enable direct control by input signals, and the other transistor thereof circuited for indirect control, the "lower" amplifier having both transistors thereof circuited to enable direct independent control by input signals, potential shifting networks for the respective inputs of the transistors of the "lower" amplifier, each shifting network being disposed in the signal path to a respective transistor of such amplifier, said potential shifting networks being so constructed that there is a difference in potential shift therebetween, each transistor of the "lower" amplifier having its collector operatively connected to connected emitters of respective "upper" amplifiers, the connected emitters of the transistors of the "lower" amplifier being adapted to be connected to a constant-current source, the collector of each directly controllable transistor of the "upper" amplifiers being connected to the collector of the indirectly controlled transistor of the other of such "upper" amplifiers, and a common collector resistance for each of such pairs of connected collectors, adapted to connect the same to the appropriate side of an operational voltage source, each pair of connected collectors forming the output side of the network.

2. An ECL gate switching network according to claim 1, wherein the bases of the respective directly controllable transistors of "upper" amplifiers comprises the inputs therefore and are connected to a common input terminal.

3. An ECL gate switching network according to claim 1, wherein the bases of the respective directly controllable transistors of the "upper" amplifiers comprise the inputs therefor, and connections to the respective inputs effected in accordance with predetermined logical linkages.

4. An ECL gate switching network according to claim 1, wherein said difference in potential shift is equal to one half of the input signal potential range.

5. An ECL gate switching network according to claim 1, wherein the bases of the respective directly controllable transistors of "upper" amplifiers comprises the inputs therefor and are connected to a common input terminal.

* * * * *